United States Patent [19]

Liu

[11] Patent Number: 4,585,670

[45] Date of Patent: Apr. 29, 1986

[54] UV CURABLE SILICONE BLOCK COPOLYMERS

[75] Inventor: Wan-Li Liu, Ballston Lake, N.Y.

[73] Assignee: General Electric Company, Waterford, N.Y.

[21] Appl. No.: 688,489

[22] Filed: Jan. 3, 1985

[51] Int. Cl.⁴ ............................................. B05D 3/06
[52] U.S. Cl. ................................. 427/54.1; 428/426; 428/429; 428/447; 528/12; 528/15; 528/24; 528/32; 526/279; 522/99
[58] Field of Search ...................... 528/32, 24, 15, 12; 526/279; 204/159.13; 427/54.1; 428/447, 426, 429

[56] References Cited

U.S. PATENT DOCUMENTS

| | | | |
|---|---|---|---|
| 3,878,263 | 4/1975 | Martin | 528/32 |
| 4,035,355 | 7/1977 | Baney et al. | 528/32 |
| 4,290,869 | 9/1981 | Pigeon | 528/32 |

*Primary Examiner*—Melvyn I. Marquis
*Attorney, Agent, or Firm*—Gary L. Loser

[57] ABSTRACT

There are provided curable polysiloxane block copolymers having at least one block of diorganosiloxane units, at least one block of trifunctional arylsiloxane units, optionally, at least one block of trifunctional alkylsiloxane units, and at least one block of acrylate-functional siloxane units. The cured compositions are transparent, self-bonding, tough, dirt repellent and solvent resistant. Methods for making the block copolymers, curable compositions, and articles of manufacture are also provided.

42 Claims, No Drawings

UV CURABLE SILICONE BLOCK COPOLYMERS

BACKGROUND OF THE INVENTION

The present invention relates to organosilicon block copolymers and methods for making such block copolymers. More particularly, the present invention relates to novel curable polysiloxane block copolymers having at least one block of diorganosiloxane units, at least one block of trifunctional aryl siloxane units, optionally, at least one block of trifunctional alkyl siloxane units, and at least one block of acrylate-functional siloxane units.

Random copolymers, although made from two or more monomers which each have at least one desirable property, do not have properties intermediate the homopolymers. An example would be to copolymerize monomer A which normally gives a hard and brittle film with monomer B which normally gives a soft and flexible film. The object of such copolymerization would be to produce a copolymer having properties intermediate those of homopolymers A and B, for example, to provide a copolymer having a hard but flexible film. With random copolymers it was found that the copolymer would generally be brittle or would still be soft, and the desired intermediate properties would not be obtained. Some improvement might be realized such as the hard and brittle polymer might be more flexible, but only marginally so.

During the past few years a great deal of interest has been shown in "sequential" or "block" copolymers. Although the same monomers and percentages of monomers make up the composition of the random copolymers and the block copolymers, the final polymers in each case differ widely in their properties. Thus, for example, a block copolymer made of monomer A and monomer B may provide the hard but flexible film which was not obtained with the random copolymer.

It would be particularly desirable to obtain UV curable block copolymers which result in transparent, adhesive, tough, dirt repellent and solvent resistant compositions. Until the instant invention such compositions were not available in the art.

Merker, U.S. Pat. No. 2,793,223, discloses acryloxymethylsiloxanes having the formula

where R is hydrogen or methyl, R' is a monovalent hydrocarbon radical, and n has a value from 1 to 2 inclusive. Such acryloxy substitued siloxanes can be copolymerized with siloxanes of the unit formula

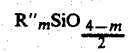

where R" is a monovalent hydrocarbon radical, an acetoxymethyl radical or a halogenated monovalent hydrocarbon radical, and m has an average value from 1 to 3 inclusive. Consideration of the examples reveals that random rather than block copolymers were prepared and that only the toughness of the resulting copolymers is revealed.

Merker, in U.S. Pat. No. 2,922,806, expands upon U.S. Pat. No. 2,793,223 in that the acryloxy or methacryloxy groups are attached to silicon through a divalent alkylene radical having from 2 to 4 carbon atoms. Again, consideration of the examples does not disclose that the resultant polymers or copolymers are adhesive, solvent resistant or dirt repellant.

Merker, U.S. Pat. No. 2,956,044, teaches that acryloxy-functional polymers and copolymers prepared only from organosilicon reactants are closely akin to conventional organosiloxane polymers in their physical properties and hence are useful as molding and impregnating resins, electrical insulating varnishes, water repellent treatments, lubricating fluids, and thermally resistant rubbers and resins. However, by preparing copolymers of acrylate-functional organosilicon units and organic vinylic units, many of the properties of organic vinylic compounds can be imparted to the copolymer, thereby making it useful as a coating agent, impregnating and molding resin, adhesive or bonding agent. Accordingly, the art is taught that adhesion is imparted to UV curable acryloxy-functional polysiloxanes by copolymerizing said polysiloxane with an organic vinylic compound.

Ohto et al., U.S. Pat. No. 3,782,940, discloses photopolymerizable silicones containing at least one unit of the formula

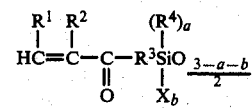

or

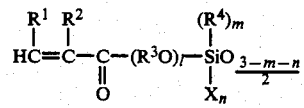

where $R^1$ is hydrogen or an unsubstituted or halogen-substituted phenyl radical, $R^2$ is hydrogen or a methyl radical, $R^3$ is an unsubstituted or halogen-substituted divalent hydrocarbon radical having from 1 to 10 carbon atoms, $R^4$ is an unsubstituted or halogen-substituted monovalent hydrocarbon radical having from 1 to 10 carbon atoms, X is a hydroxyl or alkoxyl radical having from 1 to 4 carbon atoms, a and b are each 0, 1 or 2 with the proviso that a+b=0, 1 or 2, 1 is 0 or 1, and m and n are each 0, 1 or 2 with the proviso m+n=0, 1 or 2.

Ohto et al., U.S. Pat. No. 3,865,588, teaches that the compositions of U.S. Pat. No. 3,782,940 can be used in planographic printing processes in addition to ion-etching processes. Neither of the Ohto et al. patents disclose block copolymers which are transparent, adhesive, tough, dirt repellent and solvent resistant.

Martin, U.S. Pat. No. 3,878,263, describes acrylate functional polysiloxane polymers of the general formula

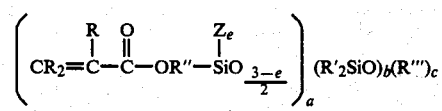

wherein the R's may be the same or different and represent hydrogen or monovalent hydrocarbon radicals having from 1 to 12 carbon atoms, R' is a monovalent hydrocarbon radical, a halogenated monovalent hydrocarbon radical or a cyanoalkyl radical having from 1 to 18 carbon atoms, R" is a divalent hydrocarbon radical having from 1 to 18 carbon atoms or the corresponding divalent hydrocarbon radical having C—O—C linkakges, R''' is a radical selected from the group consisting of R''''O$_{0.5}$ and R'$_3$SiO$_{0.5}$, Z is selected from the group consisting of OR'''', R'''' and OSiR'$_3$, a and b equal from 1 to 20,000, c equals from 0 to 3, and e equals from 0 to 2, however, when c is 0 then at least one Z must be OR''''. Such polymers are said to be useful as sizing agents and as protective coatings for paper and fabrics.

Baney et al., U.S. Pat. No. 4,035,355, discloses that certain acrylate-containing polyorganosiloxanes and a hydroperoxy polymerization initiator result in an anaerobically curing sealant composition.

The present invention is based on the discovery that UV curable block copolymers having critical amounts of specified siloxane blocks will result in transparent, adhesive, tough, dirt repellent and solvent resistant silicone compositions.

SUMMARY OF THE INVENTION

It is an object of the present invention to provide novel ultraviolet light curable silicone compositions.

It is another object of the present invention to provide transparent, self-bonding, tough, dirt repellent and solvent resistant silicone compositions.

Still another object of the present invention is to provide methods for making the aforesaid UV-curable and UV-cured silicone compositions.

The stated objects are accomplished in one aspect by a curable composition, comprising:

(A) 100 parts by weight of a polysiloxane block copolymer, comprising:

(i) a block having from about 6 to about 120 units of the formula $R_2SiO$ (ii) a block having from about 3 to about 160 units of the formula $R^1SiO_{1.5}$, (iii) optionally, a block having from 1 to about 80 units of the formula $R^2SiO_{1.5}$, (iv) from about 0.1 to about 20 mole percent of (i), (ii) and (iii) of units of the formula $R^3RSiO$;

where R is an independently selected alkyl radical having 1 to 5 carbon atoms, an aryl radical having 6 to 10 carbon atoms, or an aralkyl radical having 6 to 10 carbon atoms; $R^1$ is an aryl or alkaryl radical having 6 to 10 carbon atoms; $R^2$ is an alkyl radical having 1 to 5 carbon atoms and $R^3$ is an acrylic-functional radical having the general formula

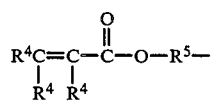

where the $R^4$ radicals may be the same or different and represent hydrogen atoms or monovalent substituted or unsubstituted hydrocarbon radicals having from 1 to 12 carbon atoms, and $R^5$ is a divalent substituted or unsubstituted hydrocarbon radical having from 2 to 12 carbon atoms; and (B) an amount of cure-initiator effective for promoting crosslinking of said polysiloxane block copolymer.

These and other objects will become clear from the following description taken together with the accompanying claims.

DESCRIPTION OF THE INVENTION

In accordance with a first aspect of the present invention there is provided novel silicone block copolymers, comprising:

(a) at least one block consisting essentially of from about 6 to about 120 units of the formula $R_2SiO$, (b) at least one block consisting essentially of from about 3 to about 160 units of the formula $R^1SiO_{1.5}$, (c) optionally, at least one block consisting essentially of from 1 to about 80 units of the formula $R^2SiO_{1.5}$, and (d) at least one block consisting essentially of from about 0.1 to about 20 mole percent of (a) and (b) of units of the formula $R^3RSiO$;

where R is an independently selected alkyl radical having 1 to 5 carbon atoms, an aryl radical having 6 to 10 carbon atoms or an aralkyl radical having 6 to 10 carbon atoms; $R^1$ is an aryl or aralkyl radical having 6 to 10 carbon atoms, $R^2$ is an alkyl radical having 1 to 5 carbon atoms and $R^3$ is an acrylic-functional radical having the general formula

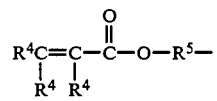

where the $R^4$ radicals may be the same or different and represent hydrogen atoms or monovalent substituted or unsubstituted hydrocarbon radicals having from 1 to 12 carbon atoms, and $R^5$ is a divalent substituted or unsubstituted hydrocarbon radical having from 2 to 12 carbon atoms.

Component (a) of the organopolysiloxane block copolymer of the present invention may contain from about 6 to about 120 diorganopolysiloxane units, however, it is preferred that each such block of diorganopolysiloxane units present in the block copolymer contain from about 6 to about 50 of such repeating diorganopolsiloxane units. Most preferably there are present from about 12 to about 30 repeating diorganopolysiloxane units per block.

The R radicals bonded to the silicon atoms of the diorganopolysiloxane block are lower alkyl radicals or substituted alkyl radicals having from 1 to 5 carbon atoms, aryl or alkaryl radicals having from 6 to 10 carbon atoms, or substituted aryl or alkaryl radicals of 6 to 10 carbon atoms. Examples of such radicals include methyl, ethyl, propyl, butyl, 3,3,3-trifluoropropyl, B-cyanoethyl, phenyl, tolyl, chlorophenyl, bromophenyl cyanophenyl and the like. Preferably, all of the organo groups of the diorganopolysiloxane block are a mixture of methyl groups and phenyl groups, and most preferably all of the R groups are methyl radicals.

The diorganopolysiloxane blocks, especially dimethylpolysiloxane blocks, will provide flexibility to the cured composition in a manner analagous to the way linear dimethylpolysiloxanes impart elasticity to silicone sealants.

Component (b) of the organopolysiloxane block copolymer of the present invention has from about 3 to about 160 trifunctional aryl or alkaryl units per block. In the most preferred embodiment there are approximately 0.75 to 1.5 trifunctional units of this type per diorganosiloxane unit (e.g. 4 to 75 units). Thus, for example, if there are 18 dimethylsiloxane units in block (a), there most preferably are from about 14 to about 27 trifunctional arylsiloxane units in block (b) Within a broader aspect of the present invention it is contemplated that a less preferred ratio is from about 0.5 to about 2 trifunctional aryl or alkaryl units per diorganosiloxane unit. In the broadest range, it is believed that there can be from about 0.1 to about 5 trifunctional siloxane units of this type per diorganosiloxane unit. The number of such arylsiloxane units per block and the number of such arylsiloxane blocks will be dependent upon the desired hardness or flexibility of the cured composition.

The $R^1$ radicals bonded to the silicon atoms of the trifunctional arylsiloxane block can have from 6 to about 10 carbon atoms. Preferably, such radicals are not substituted but in some instances the artisan may desire to use, for example, halogen or cyano substituted aryl or alkaryl radicals. Included within the scope of the $R^1$ radicals are, for example, phenyl, tolyl and xylyl, and halo or cyano groups attached thereto in place of a hydrogen atom. Most preferably all of the $R^1$ groups are phenyl radicals.

Trifunctional arylsiloxane units within the scope of (b) impart hardness to the material in much the same way a filler imparts tensile strength to a silicone sealant. Consequently, it is not critical that a reinforcing filler be included in the present composition.

Optional component (c) of the organopolysiloxane block copolymer consists essentially of from 1 to 80 trifunctional alkylsiloxane units. Alkyl trifunctional siloxy units are optional in the block copolymers of the present invention, but their inclusion in block copolymers provides particularly good compositions. Preferably such trifunctional alkylsiloxane units are present at about 10 mole percent of the trifunctional arylsiloxane units, however, they may be present from as little as about 5 mole percent to as much as about 50 mole percent of the arylsiloxane units. For example, if there are 18 dimethylsiloxane units and 14 to 27 trifunctional arylsiloxane units, there may be from 1 to about 14 alkylsiloxane units present. Most preferably there should be two or three alkylsiloxane units in the block.

The $R^2$ radicals of component (c) are selected from the alkyl R radicals as described hereinabove for component (a). The alkyl radicals of the trifunctional alkylsiloxane block need not be the same as the alkyl radicals of the diorganosiloxane block. Most preferably R is also methyl in these blocks.

Trifunctional alkylsiloxane units, like the trifunctional arylsiloxane units, also impart strength and rigidity to the cured product.

Component (d), an essential block of the copolymer, is present in an amount of from about 0.1 to about 20 mole percent of the sum of components (a) and (b). More preferably the (d) units are present in an amount ranging from about 0.5 to about 10 mole percent of components (a) and (b) and most preferably the (d) units are present at about one mole percent of components (a) and (b). Thus, if there are 18 diorganosiloxane units, 18 trifunctional arylsiloxane units, and 3 trifunctional alkylsiloxane units present, the copolymer can contain from 1 to about 5 acrylic-containing diorganosiloxy units.

The R radicals of component (d) are selected from the same R radicals described earlier for component (a). It is not necessary that these R groups be the same as the other R groups but, preferably, all of the R groups are methyl.

The $R^3$ radicals of component (d) can be any acrylic-functional radical of the general formula

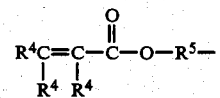

where the $R^4$ radicals may be the same or different and represent hydrogen atoms or monovalent substituted or unsubstituted hydrocarbon radicals having from 1 to 12 carbon atoms, and $R^5$ is a divalent substituted or unsubstituted hydrocarbon radical having from 2 to 12 carbon atoms. Preferably, the $R^4$ groups are all hydrogen, methyl, or a mixture of hydrogen and methyl. It is also preferred that $R^5$ be a divalent hydrocarbon group having 3 to 5 carbon atoms. Thus, the most preferred $R^3$ radicals are, for example, acryloxpropyl, methacryloxypropyl and the like.

Acrylic-functional diorganosiloxane units within the scope of component (d), in addition to providing sites for crosslinking, also impart flexibility to the block copolymer. Thus, component (d) enables the artisan to simultaneously control both crosslink density and flexibility. Of course, as the block copolymer is made larger by including more than one block of each type, the number of crosslinking sites will also increase depending on the desired properties of the cured composition.

Monofunctional siloxane units and tetrafunctional siloxane units can also be present in the block copolymers of the present invention. These groups are not essential to the instant invention but are not detrimental if present in limited amounts. The amounts of such monofunctional and tetrafunctional siloxane units which can be present are readily determined by the artisan without undue experimentation.

It will be apparent to those skilled in the art that the block copolymers of the present invention are not limited to those copolymers having equal numbers of each type of block in the copolymer. Rather, the number of each type of block can be varied depending upon whether the cured composition is to be more rigid, and hence requiring more trifunctional units, or more flexible, and hence requiring more difunctional units. The artisan will also appreciate that it is not critical that the blocks be present in any particular sequence.

Those of ordinary skill in the art will further appreciate that the degree of flexibility or rigidity can also be controlled by the number of siloxane units in a particular block. For example, if a more flexible composition is desired, the artisan can increase the length of the diorganopolysiloxane blocks. Of course, the effect on the composition's flexibility will be different depending upon whether the block length is increased or the number of diorganopolysiloxane blocks is increased. Such variations as well as many others are well within the skill of the artisan and are not intended to limit the spirit or scope of the present invention.

It is permissible to dissolve the block copolymers of the present invention in a suitable solvent, for example, mineral spirits or toluene.

The block copolymers of the present invention can be prepared by a variety of ways known in the art. In a particularly preferred method 100 parts by weight of a silanol terminated polydiorganosiloxane having repeating units varying from 6 to 120 is placed in a reaction vessel containing from about 100 to 500 parts by weight of organic solvent such as toluene and from about 500 to about 2500 parts by weight water. The amount of solvent and water employed is not critical, and no advantage is found in using excessively large quantities. Sufficient agitation is applied to form a dispersion. An amount of phenyltrichlorosilane, methyltrichlorosilane and acrylic-functional dichlorosilane in a solvent such as toluene are added to the reaction vessel containing the dispersion, while providing sufficient agitation to maintain the dispersion. The dispersion is stirred at from about 25° C. to about 50° C. for anywhere from 15 minutes to 10 hours or more to effect reaction. The resultant aqueous phase contains reaction by-products such as hydrogen chloride while the organic phase contains the acrylic-functional block copolymers of the present invention. If desired, the block copolymers can be further purified by washing with water and then azeotroping off residual water and acid.

The amount of the respective silanes added to the initial dispersion can, of course, be varied as described hereinabove to provide a block copolymer which will impart to the cured composition the desired properties. It is important that the addition of the reactants be kept in order to produce the desired copolymer where large blocks are to be prepared. Where, however, the blocks are only of 1 or 2 repeating units, all of the components can be mixed together. The artisan will also be able to adapt other methods known in the art to prepare the block copolymers of the present invention.

In a second aspect, the present invention provides curable compositions which comprise the hereinabove-described block copolymers and at least one suitable cure-initiator in an amount effective for promoting crosslinking of said block copolymer. Preferably there is utilized an effective amount of photoinitiator which generally is from about 0.05 to 5% by weight of the acrylic-functional block copolymer, but can be more or less depending upon the particular photoinitiator employed. Examples of suitable photoinitiators include t-butylperbenzoate, amino, nitro and phenol compounds such as p-hydrodiphenyl, p-nitroaniline, 2,6-dichloro-4-nitroaniline, keto compounds such as acetophenone, Michler's ketone, aldehydes such as benzaldehydes, quinones such as benzoquinone and anthroquinone, and anthrone compounds such as 3-methyl-1,3-diazo-1,9-benzanthrone. Other photoinitiators suitable for use in the UV curable composition of the invention can be ascertained by the artisan without undue experimentation. Cure initiators for heat curing are well known in the art, for example, benzoyl peroxide. Similarly, the artisan will know suitable initiators such as Fenton's reagent for room temperature curing.

The curable compositions of the present invention can be prepared simply by mixing the cure initiator into the block copolymer. It is possible, of course, to include one or more optional ingredients well known in the art such as inhibitors, fillers and the like.

In a third aspect of the present invention there is provided a transparent, self-bonding, tough, dirt repellent and solvent resistant composition. Normally, the aforesaid curable composition of the present invention is applied to a substrate, for example an electronic component or device, and thereafter exposed to an amount of ultraviolet radiation or heat (e.g. elevated temperature or room temperature) effective for crosslinking the block copolymer.

The particular details for curing the compositions of the present invention will depend on the particular application. However, those skilled in the art will be able to determine optimum curing conditions without undue experimentation.

The following examples are illustrative of the practice of the present invention and are not intended to limit the scope of the claimed invention. All parts are by weight unless otherwise stated.

EXAMPLES

Example 1—Preparation of Block Copolymers

Twenty five grams of silanol terminated polydimethylsiloxane having 24 repeating units on average per polymer chain, ninty grams of toluene and 500 grams of distilled water were placed into a three necked round bottom flask equipped with a thermometer, a stirrer and a dropping funnel. Sufficient agitation was applied to form a dispersion. In a predried flask 54 grams of phenyltrichlorosilane, 3.8 grams of methyltrichlorosilane, 5.0 grams of methacryloxypropylmethyldichlorosilane and 90 grams of toluene were admixed. The chlorosilane admixture was then added to the dispersion in the three-necked flask over a period of about two minutes. Following addition of the chlorosilanes, stirring was continued for about thirty minutes at a temperature of about 45° C. The aqueous phase containing hydrogen chloride by-product was then separated from the organic phase which contained the organopolysiloxane block copolymer. The organopolysiloxane layer was washed with water and azeotroped for one hour to remove residual water and acid. Additional examples were prepared wherein the amounts of the various blocks were varied. The results are set forth in Table I.

TABLE I

| Example # | $HO-(SiO)_{24}H$ with $CH_3$/$CH_3$ | $SiCl_3$ | $CH_3SiCl_3$ | $CH_2=C(CH_3)-C(O)-O(CH_2)_3SiCl_2$[1] | Results |
|---|---|---|---|---|---|
| 1a | 25 g | 54 g | 3.8 g | 2 wt. % | Brittle solid |

TABLE I-continued

| Example # | HO$\{$SiO$\}_{72}$H with CH$_3$/CH$_3$ | SiCl$_3$ | CH$_3$SiCl$_3$ | CH$_2$=C(CH$_3$)—C(O)—O(CH$_2$)$_3$SiCl$_2$[1] | Results |
|---|---|---|---|---|---|
|  | (0.34 mole) | (0.25 mole) |  |  |  |
| 1b | 25 g | 54 g | 3.8 g | 2 wt. % | Brittle solid[2] |
| 1c | 25 g | 72 g | 3.8 g | 2 wt. % | Brittle solid |
|  |  | (0.34 mole) |  |  |  |
| 1d | 25 g | 54 g | — | 5 wt. % | Brittle solid |
| 1e | 25 g | 27 g | 3.8 g | 2 wt. % | Soft fluid[2] |
|  |  | (0.13 mole) |  |  |  |
| 1f | 25 g | 18 g | 3.8 g | 1 wt. % | Soft fluid[2] |
|  |  | (0.09 mole) |  |  |  |
| 1g | 25 g | 45 g | 3.8 g | 1 wt. % | Tacky solid[2] |
|  |  | (0.21 mole) |  |  |  |
| 1h | 25 g | 45 g | 3.8 g | 1 wt. % | Tack-free solid[3] |
| 1i | 25 g | 45 g | 3.8 g | 1 wt. % | Tack-free solid[4] |

[1]Wt. % is based on the methacrylyl group.
[2]Condensed overnight in the presence of zinc octoate.
[3]Condensed three days in the presence of zinc octoate.
[4]Condensed one week in the presence of zinc octoate.

Example 2—UV Cured Compositions Prepared from Block Copolymer 1g

To 100 parts by weight of the block copolymer prepared in Example 1g (dissolved in toluene) there was added varying amounts of photoinitiator. The UV curable composition was then applied to each of a glass plate, epoxy plate and metal plate, the solvent evaporated, and thereafter the coated substrate was exposed under a nitrogen atmosphere to a UV source having an output of 420 watts for a time equivalent to 20 feet per minute. The results are set forth in Table II.

TABLE II

| Example # | Photoinitiator[1] | Result |
|---|---|---|
| 2a | 5 wt. % t-butylperbenzoate | Tack-free cure |
| 2b | 3 wt. % t-butylperbenzoate | Tack-free cure |
| 2c | 5 wt. % diethylacetophenone | Tack-free cure |
| 2d | 4 wt. % diethylacetophenone | Tack-free cure |
| 2e | 3 wt. % diethylacetophenone | Tack-free cure |
| 2f | 2 wt. % diethylacetophenone | Tack-free cure |
| 2g | 1 wt. % diethylacetophenone | Tack-free cure |

[1]Based on the solids content of the block copolymer.

Each of the cured compositions was highly transparent and exhibited excellent toughness, adhesion, dirt repellency and solvent resistance.

Example 3—Thermally Cured Compositions Prepared from Block Copolymer 1a

Two curable compositions, identified as 3a and 3b, were prepared by mixing 100 parts by weight of block copolymer 1a with 1 part by weight Supersol PMS (50% butyl peroctoate in mineral spirits). Two more curable compositions, identified as 3c and 3d, were prepared by mixing 100 parts by weight of block copolymer 1a with 1 part by weight benzoyl peroxide. Examples 3a and 3c were placed in an oven maintained at 80° C. and Examples 3b and 3d were placed in an oven maintained at 100° C. The results are set forth in Table III.

TABLE III

| Example # | Curing Temp. | Curing Time | Result |
|---|---|---|---|
| 3a | 80° C. | 10 min. | No cure |
| 3a | 80° C. | 20 min. | No cure |
| 3a | 80° C. | 30 min. | No cure |
| 3a | 80° C. | 40 min. | No cure |
| 3b | 100° C. | 5 min. | No cure |
| 3b | 100° C. | 10 min. | Tack-free cure |
| 3c | 80° C. | 10 min. | No cure |
| 3c | 80° C. | 20 min. | No cure |
| 3c | 80° C. | 25 min. | No cure |
| 3d | 100° C. | 5 min. | No cure |
| 3d | 100° C. | 10 min. | Tack-free cure |

Example 4—Room Temperature Cured Compositions Prepared from Block Copolymer 1a One hundred parts by weight of block copolymer 1a (dissolved in toluene) was mixed with 3 parts cumene hydroperoxide and 1 drop cobalt naphthalate (Fenton's reagent) as well as 1.5 parts triethylamine accelerator. The composition was cast on glass, epoxy and metal substrates. In each case, a brownish, transparent composition having excellent adhesion, toughness, dirt repellency and solvent resistance was obtained in about ten minutes. Additional room temperature cured compositions were prepared as set forth in Table IV.

TABLE IV

| Example # | Block Copolymer | Photoinitiator | Metal | Acid | Result |
|---|---|---|---|---|---|
| 4a[1] | 20 parts | 0.5 part t-butylperbenzoate | 50 ppm Ferric Sulfate[2] | 1.5 wt % Maleic Acid[2] | opaque[3] cure |
| 4b[1] | 20 parts | 0.5 part benzyl peroxide | 50 ppm Ferric Sulfate[2] | 1.5 wt % Maleic Acid[2] | opaque[3] cure |
| 4c[1] | 20 parts | 0.5 part benzyl peroxide | 500 ppm Iron (III) 2.4-pentane- | 1.5 wt % Methacrylic Acid | clear[3] cure |

TABLE IV-continued

| Example # | Block Copolymer | Photoinitiator | Metal | Acid | Result |
|---|---|---|---|---|---|
| | | | | dionate | |

[1] includes 3.3 parts Akrochem 40 accelerator
[2] ferric sulfate and maleic acid are insoluble in toluene
[3] curing took about three hours

I claim:

1. A silicone block copolymer composition, comprising:
   (a) at least one block consisting essentially of from about 6 to about 120 units of the formula $R_2SiO$, (b) at least one block consisting essentially of from about 3 to about 160 units of the formula $R^1SiO_{1.5}$, and
   (c) at least one block consisting essentially of from about 0.1 to about 20 mole percent of (a) and (b) of units of the formula $R^3RSiO$;

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula $$\begin{array}{c} O \\ \| \\ R^4C=C-C-O-R^5- \\ | \quad | \\ R^4 \quad R^4 \end{array}$$

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms.

2. The composition of claim 1, further comprising at least one block consisting essentially of from 1 to about 80 units of the formula $R^2SiO_{1.5}$ where $R^2$ is an alkyl radical having from 1 to 5 carbon atoms.

3. The composition of claim 1 wherein siloxane block (a) consists essentially of from about 6 to about 50 units, siloxane block (b) consists essentially of from about 4 to about 75 units, and siloxane block (c) consists essentially of from about 0.5 to about 10 mole percent of the sum of said (a) blocks and (b) blocks.

4. The compositions of claim 2 wherein there is present from 1 to about 8 units of the formula $R^2SiO_{1.5}$ where $R^2$ is an alkyl radical having from 1 to 5 carbon atoms.

5. The composition of claim 1 wherein $R^3$ is acryloxypropyl, methacryloxypropyl or a mixture thereof.

6. A method for making a silicone block copolymer composition, comprising:
   (a) mixing an organic solvent, water and a silanol terminated polydiorgansiloxane having repeating units of from about 6 to about 120,
   (b) adding to the reaction mass of step (a) an amount of aryltrichlorosilane and acrylic-functional dichlorosilane, and
   (c) reacting the silanol terminated polydiorganosiloxane of step (a) with the chlorosilanes of step (b).

7. The method of claim 6 further comprising adding in step (b) an amount of alkyltrichlorosilane.

8. The method of claim 6 wherein the aryltrichlorosilane and acrylic-functional dichlorosilane are added to the reaction mass of step (a) simultaneously.

9. The method of claim 6 wherein the aryltrichlorosilane and acrylic-functional dichlorosilane are added to the reaction mass of step (a) consecutively.

10. The method of claim 6 wherein reaction of the silanol terminated polydiorganosiloxane and the chlorosilanes is effected by stirring at from about 25° C. to about 50° C. for from about 15 minutes to about 10 hours.

11. A curable composition, comprising:
   (A) 100 parts by weight of an organopolysiloxane block copolymer, comprising:
      (i) at least one block consisting essentially of from about 6 to about 120 units of the formula $R_2SiO$, (ii) at least one block consisting essentially of from about 3 to about 160 units of the formula $R^1SiO_{1.5}$, and
      (iii) at least one block consisting essentially of from about 0.1 to about 20 mole percent of (a) and (b) of units of the formula $R^3RSiO$;

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula $$\begin{array}{c} O \\ \| \\ R^4C=C-C-O-R^5- \\ | \quad | \\ R^4 \quad R^4 \end{array}$$

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms; and (B) an amount of cure-initiator effective for promoting crosslinking of said organopolysiloxane block copolymer.

12. The composition of claim 11 wherein the block copolymer further comprises at least one block consisting essentially of from 1 to 80 units of the formula $$R^2SiO_{1.5}$$

where $R^2$ is an alkyl radical having from 1 to 5 carbon atoms.

13. The composition of claim 11 wherein siloxane block (A)(i) consists essentially of from about 6 to about 50 units, siloxane block (A)(ii) consists essentially of from about 4 to about 75 units, and siloxane block (A)(iii) consists essentially of from about 0.5 to about 10 mole percent of the sum of said (A)(i) blocks and (A)(ii) blocks.

14. The composition of claim 12 wherein there is present from 1 to about 8 units of the formula $$R^2SiO_{1.5}$$

where $R^2$ is an alkyl radical having from 1 to 5 carbon atoms.

15. The composition of claim 11 wherein $R^3$ is acryloxypropyl, methacryloxypropyl or a mixture thereof.

16. The composition of claim 11 wherein the cure-initiator is a photoinitiator and is present in an amount of from about 0.05 percent by weight to about 5 percent by weight based on the weight of the acrylic-functional block copolymer.

17. A method for making a curable composition, comprising mixing:
(A) 100 parts by weight of an organopolysiloxane block copolymer, comprising:
(i) at least one block consisting essentially of from about 6 to about 120 units of the formula $$R_2SiO,$$

(ii) at least one block consisting essentially of from about 3 to about 160 units of the formula $$R^1SiO_{1.5}$$

(iii) at least one block consisting essentially of from about 0.1 to about 20 mole percent of (a) and (b) of units of the formula $$R^3RSiO;$$

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula

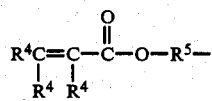

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms; and (B) an amount of cure-initiator effective for promoting crosslinking of said organopolysiloxane block copolymer.

18. The method of claim 17 wherein the block copolymer further comprises at least one block consisting essentially of from 1 to 80 units of the formula $$R^2SiO_{1.5}$$

where $R^2$ is an alkyl radical having from 1 to 5 carbon atoms.

19. The method of claim 17 wherein siloxane block (A)(i) consists essentially of from about 6 to about 50 units, siloxane block (A)(ii) consists essentially of from about 4 to about 75 units, and siloxane block (A)(iii) consists essentially of from about 0.5 to about 10 mole percent of the sum of said (A)(i) blocks and (A)(ii) blocks.

20. The method of claim 18 wherein there is present from 1 to about 8 units of the formula $$R^2SiO_{1.5}$$

where $R^2$ is a alkyl radical having from 1 to 5 carbon atoms.

21. The method of claim 17 wherein $R^3$ is acryloxypropyl, methacryloxypropyl or a mixture thereof.

22. The method of claim 17 wherein the cure-initiator is a photoinitiator and is present in an amount of from about 0.05 percent by weight to about 5 percent by weight based on the weight of the acrylic-functional block copolymer.

23. A method for making an article of manufacture, comprising:
(I.) applying to a substrate a curable composition comprising:
(A) 100 parts by weight of an organopolysiloxane block copolymer, comprising:
(i) at least one block consisting essentially of from about 6 to about 120 units of the formula $$R_2SiO,$$

(ii) at least one block consisting essentially of from about 3 to about 160 units of the formula $$R^1SiO_{1.5},$$

and
(iii) at least one block consisting essentially of from about 0.1 to about 20 mole percent of (a) and (b) of units of the formula $$R^3SiO;$$

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula

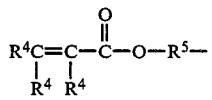

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms; and (B) an amount of cure-initiator effective for promoting crosslinking of said organopolysiloxane block copolymer;

(II.) curing said curable composition.

24. The method of claim 23 wherein the block copolymer further comprises at least one block consisting essentially of from 1 to 80 units of the formula $$R^2SiO_{1.5}$$

where $R^2$ is an alkyl radical having from 1 to 5 carbon atoms.

25. The method of claim 23 wherein siloxane block (A)(i) consists essentially of from about 6 to about 50 units, siloxane block (A)(ii) consists essentially of from about 4 to about 75 units, and siloxane block (A)(iii) consists essentially of from about 0.5 to about 10 mole percent of the sum of said (A)(i) blocks and (A)(ii) blocks.

26. The method of claim 24 wherein there is present from 1 to about 8 units of the formula $$R^2SiO_{1.5}$$

where $R^2$ is an alkyl radical having from 1 to 5 carbon atoms.

27. The method of claim 23 wherein $R^3$ is acryloxypropyl, methacryloxypropyl or a mixture thereof.

28. The method of claim 23 wherein the cure-initiator is a photoinitiator and is present in an amount of from about 0.5 percent by weight to about 5 percent by weight based on the weight of the acrylic-functional block copolymer.

29. The method of claim 23 wherein curing is effected by exposing said curable composition to an amount of ultraviolet radiation effective for curing said composition.

30. The method of claim 23 wherein curing is effected by heating said curable composition at an elevated temperature for an amount of time effective for curing said composition.

31. The method of claim 30 wherein said elevated temperature is at least 100° C.

32. The method of claim 23 wherein the substrate is an electronic component or device.

33. An article of manufacture prepared by a process comprising the steps:

(I.) applying to a substrate a curable composition comprising:

(A) 100 parts by weight of an organopolysiloxane block copolymer, comprising:

(i) at least one block consisting essentially of from about 6 to about 120 units of the formula $$R_2SiO,$$

(ii) at least one block consisting essentially of from about 3 to about 160 units of the formula $$R^1SiO_{1.5},$$

and (iii) at least one block consisting essentially of from about 0.1 to about 20 mole percent of (a) and (b) of units of the formula $$R^3RSiO;$$

where R is an independently selected alkyl radical having 1 to 5 carbon atoms, aryl radical having 6 to 10 carbon atoms, or aralkyl radical having 6 to 10 carbon atoms; $R^1$ is an aryl or aralkyl radical having 6 to 10 carbon atoms; and $R^3$ is an acrylic-functional radical having the general formula

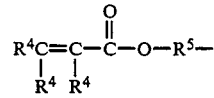

where the $R^4$ radicals are the same or different and represent hydrogen atoms or monovalent substituted or unsubstituted hydrocarbon radicals having from 1 to 12 carbon atoms and $R^5$ is a divalent substituted or unsubstituted hydrocarbon radical having from 2 to 12 carbon atoms; and (B) an amount of cure-initiator effective for promoting crosslinking of said organopolysiloxane block copolymer;

(II.) curing said curable composition.

34. The article of claim 33 wherein the block copolymer further comprises at least one block consisting essentially of from 1 to 80 units of the formula $$R^2SiO_{1.5}$$

where $R^2$ is an alkyl radical having from 1 to 5 carbon atoms.

35. The article of claim 33 wherein siloxane block (A)(i) consists essentially of from about 6 to about 50 units, siloxane block (A)(ii) consists essentially of from about 4 to about 75 units, and siloxane block (A)(iii) consists essentially of from about 0.5 to about 10 mole percent of the sum of said (A)(i) blocks and (A)(ii) blocks.

36. The article of claim 34 wherein there is present from 1 to about 8 units of the formula $$R^2SiO_{1.5}$$

where $R^2$ is an alkyl radical having from 1 to 5 atoms.

37. The article of claim 33 wherein $R^3$ is acryloxypropyl, methacryloxypropyl or a mixture thereof.

38. The article of claim 33 wherein the cure-initiator is a photoinitiator and is present in an amount of from about 0.05 percent by weight to about 5 percent by weight based on the weight of the acrylic-functional block copolymer.

39. The article of claim 33 wherein curing is effected by exposing said curable composition to an amount of ultraviolet radiation effective for curing said composition.

40. The article of claim 33 wherein curing is effected by heating said curable composition at an elevated temperature for an amount of time effective for curing said composition.

41. The article of claim 40 wherein said elevated temperature is at least 100° C.

42. The article of claim 33 wherein the substrate is an electronic component or device.

* * * * *